US006193011B1

(12) United States Patent
Harris

(10) Patent No.: US 6,193,011 B1
(45) Date of Patent: Feb. 27, 2001

(54) FAN INLET FLOW CONTROLLER

(75) Inventor: Stanley M. Harris, New Philadelphia, OH (US)

(73) Assignee: New Philadelphia Fan Company, New Philadelphia, OH (US)

( * ) Notice: Subject to any disclaimer, the term of this patent is extended or adjusted under 35 U.S.C. 154(b) by 0 days.

(21) Appl. No.: 09/249,745

(22) Filed: Feb. 11, 1999

Related U.S. Application Data

(62) Division of application No. 08/730,925, filed on Oct. 18, 1996, now Pat. No. 5,979,595.

(51) Int. Cl.[7] ........ B64D 33/02
(52) U.S. Cl. ........ 181/214
(58) Field of Search ........ 181/213, 214, 181/222, 224, 225, 229, 238; 415/119

(56) References Cited

U.S. PATENT DOCUMENTS

Re. 31,258 5/1983 DeBaun .
1,506,601 8/1924 Nelson .
1,533,364 4/1925 Barrott .
1,906,408 5/1933 Persons .
2,325,913 8/1943 McLemore, Jr. .
2,601,947 7/1952 Buttner .
2,946,345 7/1960 Weltmer .
2,979,151 4/1961 Blackwell et al. .
3,185,252 5/1965 Lemmerman .
3,266,437 8/1966 Blackmore et al. .
3,483,676 12/1969 Sargisson .
3,519,024 7/1970 Johnson et al. .
3,572,391 3/1971 Hirsch .
3,840,051 10/1974 Akashi .
3,871,844 3/1975 Calvin, Sr. .
3,964,519 6/1976 DeBaun .
4,180,141 12/1979 Judd .
4,204,586 5/1980 Hani et al. .
4,304,094 12/1981 Amelio .
4,319,521 3/1982 Gorchev et al. .
4,660,587 4/1987 Rizzie .
4,691,561 9/1987 Ganz et al. .
4,692,091 9/1987 Ritenour .
4,818,183 4/1989 Schaefer .
5,088,886 2/1992 Hopkins .
5,099,879 3/1992 Baird .
5,405,106 4/1995 Chintamani et al. .
5,411,224 5/1995 Dearman et al. .
5,473,123 12/1995 Yazici et al. .
5,548,093 * 8/1996 Sato et al. ........ 181/224

FOREIGN PATENT DOCUMENTS 424 069 5/1967 (CH) .
25 47 611 4/1977 (DE) .
574 605 12/1993 (EP) .
91/15664 10/1991 (WO) .
95/06189 3/1995 (WO) .

OTHER PUBLICATIONS

Dryer Anguline & Inline Fans, The Dryer Fan Co., Bloomingdale, IL., Publication date unknown.

* cited by examiner

*Primary Examiner*—Khanh Dang
(74) *Attorney, Agent, or Firm*—Kirkpatrick & Lockhart LLP

(57) ABSTRACT

An apparatus for reducing distortion of air flow entering the inlet of a fan. The device includes a perforated body member that has a first end that is attachable to the inlet end of the fan and a second end. The apertures in the body member are arranged in a plurality of circumferential rows. Preferably, the apertures in each successive row from the first end to the second end increase in diameter with the apertures in the row adjacent the first end being smaller in diameter than the apertures in the row adjacent the second end. The body member can be frustoconical, cylindrical or ellipsoidal in shape. In addition, the body member can be equipped with an apparatus for reducing airflow noise.

5 Claims, 11 Drawing Sheets

FAN INLET FLOW CONTROLLER

CROSS REFERENCE TO RELATED APPLICATIONS

This application is a divisional application of U.S. patent application Ser. No. 08/730,925, filed Oct. 18, 1996, now U.S. Pat. No. 5,979,595.

BACKGROUND OF THE INVENTION

1. Field of the Invention

The present invention relates to air moving apparatuses and, more particularly, is directed to a device for reducing the distortion of air entering the inlet of a fan and the noise created thereby.

2. Description of the Invention Background

Over the years, a variety of devices have been developed for moving air and other gases. For example, various types of fans have been created for moving air for heating, ventilating and cooling purposes in residential and industrial structures alike. Virtually all refrigerators, freezers and air conditioners are equipped with a fan for moving air across their heat-exchanger coils. Fans are also frequently used in industrial applications for moving process air and contaminated air through filtration and pollution control systems. Electronic equipment may require cooling fans to prevent "hot spots" from developing within the equipment which could damage sensitive electrical components. Machines used to dry raw and processed materials use fans for circulating heated air to the product and for carrying moisture away from the materials. Air support structures require fans to inflate them and maintain their supporting pressure.

Fans are generally classified by the nature of the airflow through their impellers. Axial flow, radial flow (centrifugal), mixed flow and cross flow are types of fan impellers commonly employed. Perhaps the two types of fans that are most commonly employed are centrifugal fans and axial fans. The construction of a centrifugal fan and an axial fan are fundamentally different. The impeller of a centrifugal fan usually includes a front rim that has a centralized opening therein and a backplate that is attached in spaced-apart parallel relation to the rim by a series of radial blades. The impeller assembly is rotatably supported within a housing which has an inlet that corresponds with the opening in the impeller rim. As the impeller is rotated within the housing, air is drawn in through the inlet and into the center of the impeller. The centrifugal force developed by the impeller causes the air to be discharged radially out of the impeller and through an outlet formed in the housing; hence the name "centrifugal fan".

An axial fan is typically equipped with a "propellertype" impeller that is rotatably supported within an air passage opening. For example, an axial fan may be mounted in a wheel or rim that is attached within an opening in a housing. As the impeller is rotated, air is drawn into or out of the housing depending upon the orientation of the impeller blades. Other axial fans are mounted within housings that can form portions of ductwork for carrying air for heating, ventilation and air conditioning purposes.

The selection of a particular size and type of fan for a particular application typically involves aerodynamic considerations, economic considerations and functional stability considerations. Axial fans are desirable air moving devices in most systems due to their relatively small sizes and high efficiencies. System design and fan applications, however, can be limited due to the axial fan's sensitivity to inlet air conditions. Axial fans often impart an air swirl at their inlets which can lead to an uneven velocity profile of inlet air immediately in front of the fan.

In addition, due to design considerations, the preferred configuration of many systems would require a change in air direction immediately in front of or at the rear of the air moving device. However, any obstruction or change in direction of airflow immediately in front of the fan can cause even more inlet air distortion which can result in a reduction in the fan's operating efficiency as well as impart cyclical stresses on the blades.

These undesirable conditions can also be caused when system components such as heat exchanging coils, sound attenuators, moisture eliminators, filters, etc. are located in close proximity to the fan inlet. It is common practice, therefore, to oversize such components to reduce the airflow distortion created thereby. Of course, such oversizing adds to equipment costs, operating costs and maintenance costs. Distortion of inlet air can also be caused by directing high velocity return air into a mixing device located in close proximity to the fan inlet. Existing building structure and design requirements also sometimes dictate that structural components (i.e., beams, joists, pipes, walls, etc.) pass through the fan inlet stream which can result in further airflow distortion.

In the past, the above-mentioned conditions were somewhat alleviated through the use of an "inlet leveling screen." An inlet leveling screen typically comprises a flat plate that has a plurality of perforations therethrough that comprise approximately fifty percent of the plate area. While such a device causes the inlet air to be more evenly distributed across the screen and thus reduces the distortion of the air as it enters the fan, it creates added airflow resistance which places a greater load on the fan motor often requiring larger, more expensive motors to be used thereby adding to equipment and operating costs. In this device, the airflow remains in an axial direction and thus objects such as heat exchanger coils, noise attenuators, filters, etc. that are placed immediately in front of the screen can limit its effectiveness.

The effectiveness of prior air inlet level screens is also limited by the screen's surface area. Thus, traditional inlet leveling screens are typically constructed with a "round-to-square" transition member attached to the inlet end of the fan housing which enables the screen area to be somewhat maximized. Such arrangements, however, are usually very large and cumbersome which makes them expensive to build and difficult to install. Further, such devices usually cannot be used in applications where space is limited.

Other fan inlet devices have been developed and are disclosed in U.S. Pat. No. Re 31,258 to De Baun, U.S. Pat. No. 3,483,676 to Sargisson, U.S. Pat. No. 3,519,024 to Johnson et al., U.S. Pat. No. 3,871,844 to Calvin, Sr., U.S. Pat. No. 5,099,879 to Baird and U.S. Pat. 5,405,106 to Chintamani et al. Devices of the types disclosed above are typically expensive to produce and install. In addition, such devices often require the use of large motors for operating the fan. Moreover, those prior devices often occupy large amounts of building space which might otherwise be used for other purposes.

Other fan-related problems exist in air distribution systems for buildings and commercial structures. Such systems typically comprise discrete functional elements coupled together in series at a central location in a building. Such a system usually includes an input plenum for mixing outside and "return" air, filters, heat exchanging coils, a fan and noise attenuation apparatus for reducing the noise created by the airflow. Because such components typically occupy large amounts of building space when linearly-aligned, it often becomes necessary to arrange components in non-linear orientations. For example, structure design considerations sometimes require that inlet ducts for fans be orientated at right angles relative to the fan inlet. In addition, because relatively high airflow velocities are required to service large buildings, sound attenuating apparatuses must be employed. However, prior sound attenuating apparatuses are typically large and expensive and difficult to manufacture and install or they are relatively small devices which undesirably restrict airflow which increases airflow distortion.

Thus, there is a need for a device for reducing distortion of airstream entering the inlets of fans without greatly adding to the airflow resistance.

There is a further need for an airflow inlet device that is small and relatively easy to install and inexpensive to produce.

There is yet another need for a fan inlet device that can be used in close proximity to coils, filters, etc. and effectively minimize the airflow distortion entering the fan's inlet.

There is still another need for a device that can reduce the distortion of an airstream in a system to such a degree such to enable axial fans to be used in applications where their uses would have otherwise been prohibited.

Another need exists for a compact air handling system that can provide airflows similar to airflows typically achieved by prior systems that occupy large spaces.

Yet another need exists for an air handling system with improved silencing characteristics.

SUMMARY OF THE INVENTION

In accordance with a particular preferred form of the present invention, there is provided an airflow inlet apparatus for reducing distorltion of air entering an inlet end of a fan assembly. In a preferred form, the inlet apparatus comprises a hollow body member that has a first and second end. The first end is attachable to the inlet end of the fan assembly. An end member is attached to the second end of the body and has a plurality of substantially uniformly distributed first apertures therethrough. A plurality of substantially uniformly distributed second apertures are provided in the hollow body member such that the second apertures adjacent the first end of the body member are smaller in diameter than the diameters of the second apertures adjacent the second end of the body member. The body member can be cylindrical, frusto-conical or ellipsoidal in shape. In another embodiment, the hollow body member houses airflow silencing apparatus for reducing noise generated by the air flowing through the body member.

In yet another preferred embodiment, the present invention comprises an airflow inlet apparatus for reducing noise generated by air entering an inlet end of a fan assembly. In a preferred form, the inlet apparatus comprises a perforated housing member and a perforated inlet duct centrally disposed within the housing member. The inlet duct is attachable to the inlet end of the fan assembly. A plurality of radially extending silencing members extend between the inlet duct and the housing and are attached thereto such that when air flows through the housing and the inlet duct to the fan assembly, the noise generated thereby is reduced by the silencing members.

Accordingly, the present invention provides solutions to the aforementioned problems encountered when using prior inlet leveling screens and sound attenuation apparatuses. The reader will appreciate that it is an object of the present invention to provide an inlet device for a fan that is relatively compact, inexpensive to produce and install and effectively reduces distortion of air flowing into the inlet of a fan.

It is another object of the present invention to provide an inlet device having the above-mentioned attributes that is also capable of reducing airflow noise.

It is still another object of the present invention to provide an inlet device that can be used in connection with air moving devices such as axial fans that would permit the use of such devices in applications wherein, due to airflow distortion, they could not have been otherwise used.

Thus, the present invention solves many of the problems encountered when moving air through structures. However, these and other details, objects and advantages will become further apparent as the following detailed description of the present preferred embodiment thereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF THE PREFERRED EMBODIMENTS

Figure 1:
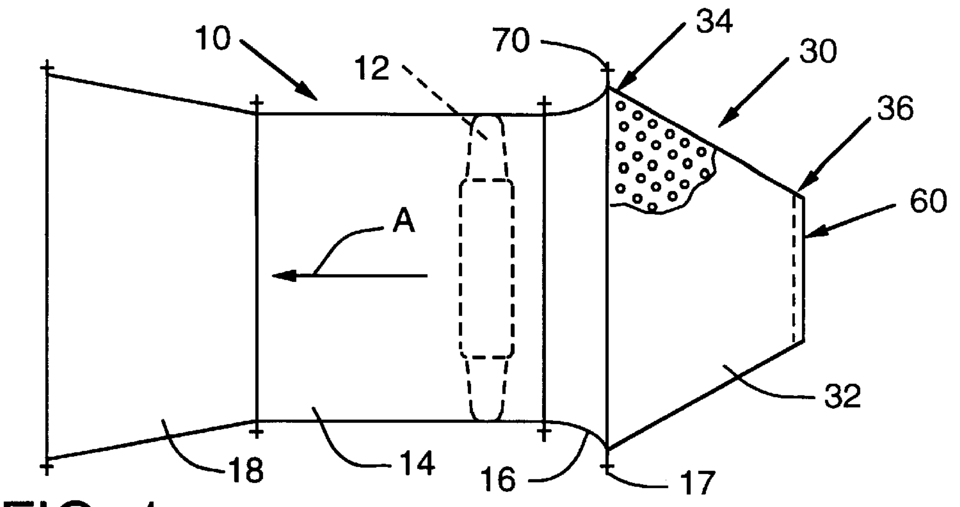
FIG. 1 is a side elevational view of a preferred airflow inlet device of the present invention attached to a fan assembly.

Referring now to the drawings for the purposes of illustrating present preferred embodiments of the invention only and not for purposes of limiting the same, the Figures show an axial fan assembly generally designated as 10. While the present invention will be described herein in connection with axial fan assemblies, the skilled artisan will readily appreciate that the subject invention could be effectively employed in a variety of other air moving systems. Accordingly, the scope of protection afforded to the subject invention should not be limited to use with axial fan arrangements.

More particularly and with reference to FIG. 1, there is shown an axial fan assembly 10 that includes a conventional fan member 12 that is housed within a housing member 14. Those of ordinary skill in the art will understand that a variety of different axial fan assemblies are commercially available. Thus, the exact construction and operation of such fan assemblies will not be discussed herein. As can be further seen in FIG. 1, a curved inlet duct 16 is preferably attached to one end of housing member 14, although inlet duct 16 may not be necessary in all applications, and a discharge duct 18 is attached to the other end of the housing member 14. The direction of airflow through the fan assembly is represented by arrow "A". Again the skilled artisan will appreciate that such a fan assembly 20 can be employed in a variety of different systems. For example, the fan assembly could be integrally attached to supply and discharge ducts or it could be received and mounted within the ducts.

Figure 2:
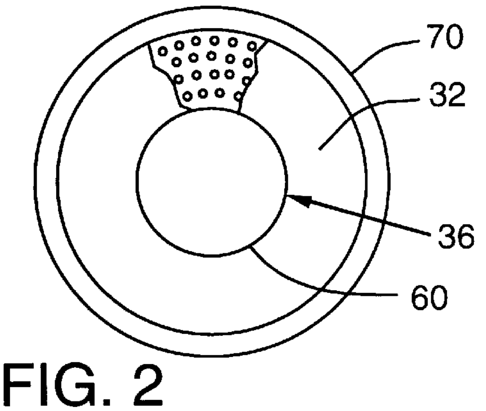
FIG. 2 is an end elevational view of the airflow inlet device of FIG. 1.
Figure 3:
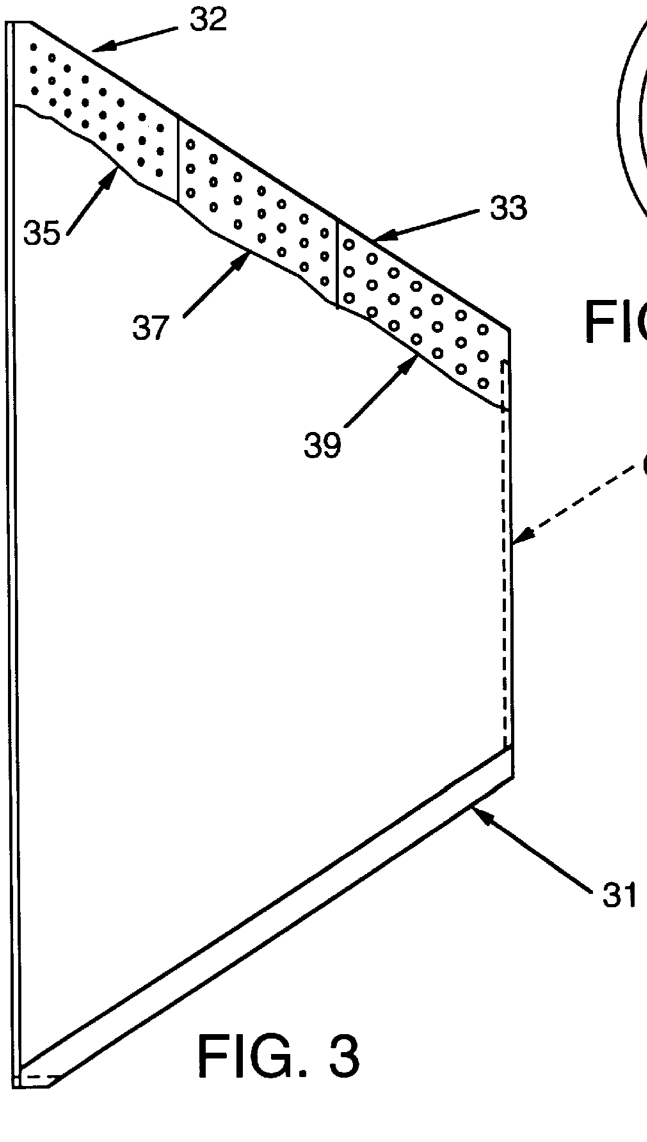
FIG. 3 is an enlarged side view of an enlarged side view of the airflow inlet device of FIGS. 1 and 2 with a portion of the skin thereof removed for clarity.

A preferred airflow inlet device 30 is shown in FIGS. 1–3. As will be discussed in further detail below, a preferred airflow inlet device 30 comprises a body member 32 and an end plate 60. In this embodiment as can be most particularly seen in FIG. 3, the body member 32 has a frusto-conical shape. In particular, the body member 32 preferably has a first flanged end 34 and a second end 36 wherein the first end 34 is larger in diameter than the second end 36. In a preferred embodiment, body member 30 is fabricated from a perforated material such as steel or aluminum; however, other suitable perforated materials could also be successfully employed.

As can be further seen in FIG. 3, the apertures 40 that are adjacent the second end 36 are preferably larger in diameter than the apertures 53 that are adjacent the first end 34. The skilled artisan will appreciate that the diameters of the first and second ends (34, 36) of the body member 32 will be dictated by the size of the fan inlet member 16. For example, the subject invention is well-adapted for use in connection with fans having eighteen inch diameter inlets to fans having eighty-four inch diameter inlets. However, the subject invention is not limited by fan diameter and could conceivably be successfully used in connection with any size of fan inlet.

By way of example, for a fan inlet having an approximate diameter of forty-two inches, a preferred fan inlet device 30 would have the characteristics discussed below. As can be seen in FIG. 3, the body portion 32 includes a conically-shaped frame member 31 that is fabricated from structural steel members. The outer skin, generally designated as 33, is fabricated from segments of perforated sheet metal that have been formed to conform to a corresponding segment of the frame 31. Preferably, the skin 33 has three segments (35, 37, 39). Segment 35 is provided with a plurality of equally distributed perforations therein that preferably comprise approximately fifty-one percent of the surface area of the skin segment 35. Likewise, segment 37 is provided with a plurality of equally distributed perforations that preferably comprise about fifty-eight percent of the surface area of the skin segment 37. Segment 39 also has a plurality of equally distributed perforations therethrough that comprise approximately sixty-three percent of the surface area of the skin segment 39. Segments (35, 37, 39) are welded together at their adjoining edges and are also preferably welded to the frame 31. A solid end plate 60 is also preferably welded to the end of frame 31. Preferably, the combination of apertures in the body member 32 comprise about sixty percent of the surface area of the inlet device 30. Although the sizes, numbers of apertures per row and the number of rows may be varied, it will be appreciated that the fan inherently induces a higher negative pressure adjacent to the first end 34 which gradually decreases along the length of the body member 32. The arrangement of apertures in the above-described pattern (i.e., apertures gradually reducing in diameter from the second end to the first end) insures a substantially uniform airflow and velocity of radial inlet air along the length of the body member 32.

Figure 4:
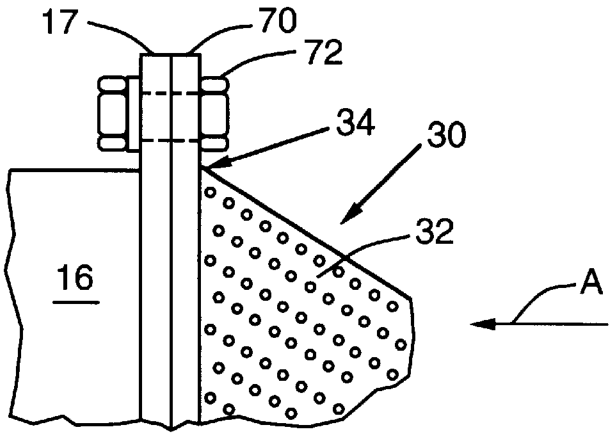
FIG. 4 is a partial side view of a preferred attachment arrangement for attaching a preferred airflow inlet device to a fan inlet member.
Figure 5:
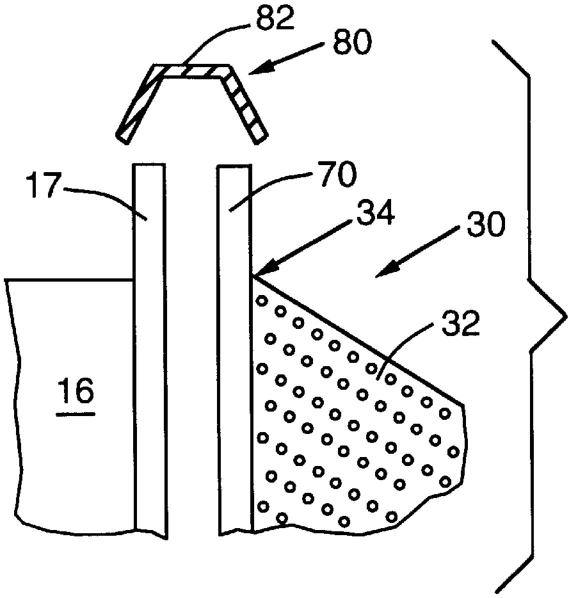
FIG. 5 is a partial exploded side view of another preferred attachment arrangement including a fastening clamp shown in cross-section for attaching a preferred airflow inlet device to a fan inlet member.
Figure 6:
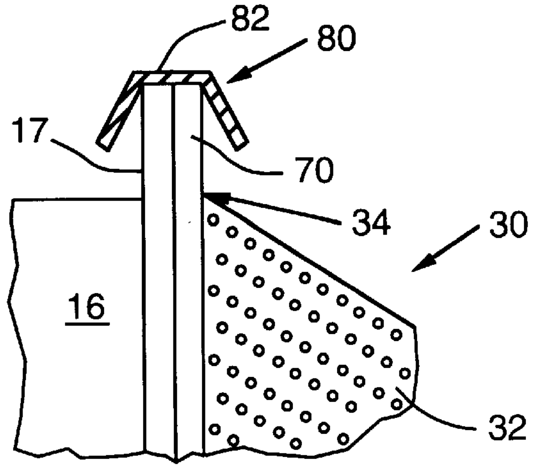
FIG. 6 is another partial side view of the attachment arrangement of FIG. 5 with the fastening clamp thereof installed around the attachment flanges of the airflow inlet member and the inlet duct.
Figure 7:
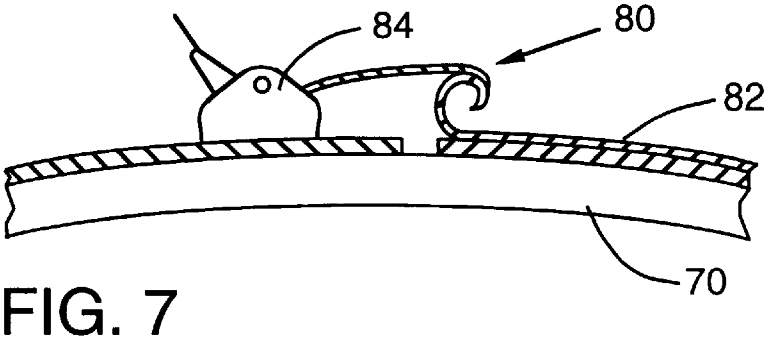
FIG. 7 is a partial end view of the fastening clamp of FIGS. 5 and 6.

To attach the member 30 to the inlet member 16 of the fan assembly 10, a flange 70 is preferably attached to the first end 34 of the body member 32. The flange 70 is of typical construction and is sized to mate with a flange 17 on the inlet member 16. In a preferred embodiment, the flanges (17, 70) are then bolted together with bolts 72. See FIG. 4. In another preferred embodiment, a commercially available circumferential flange clamp 80 is employed to connect the flanges (17, 70). More particularly and with reference to FIGS. 5–7, circumferential flange clamp 80 has a body portion 82 that is sized to fit around the circumference of flanges (17, 70) when the clamp 80 is in an open position. After the body portion 82 has been fitted over the flanges (17, 70), the clamp 84 is activated to draw the body portion 82 tightly around the flanges (17, 70). Those of ordinary skill in the art will appreciate, however, that other known methods of connecting flanges (17, 70) could also be employed.

Figure 8:
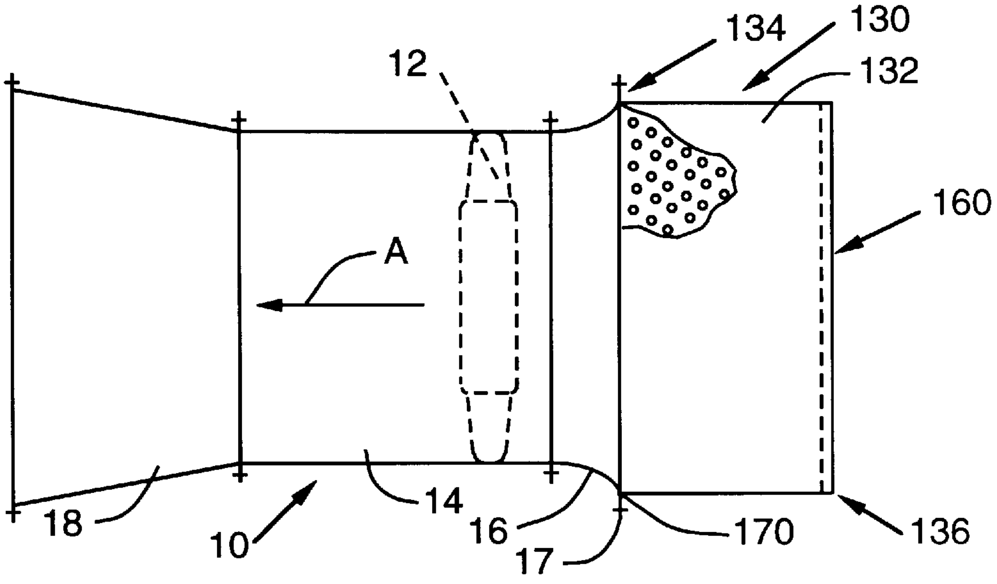
FIG. 8 is a side elevational view of another preferred airflow inlet device of the present invention attached to a fan assembly.
Figure 9:
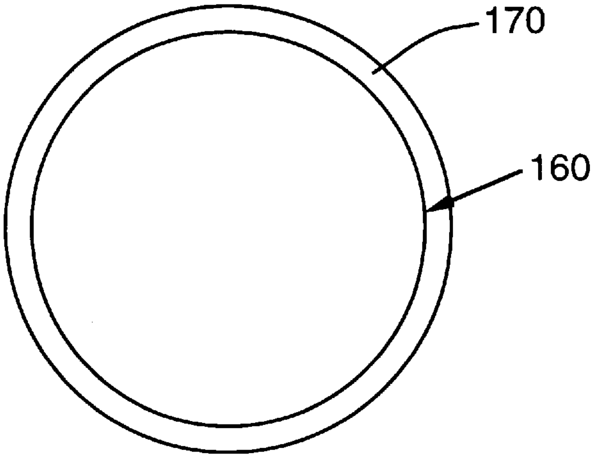
FIG. 9 is an end elevational view of the airflow inlet device of FIG. 8.
Figure 10:
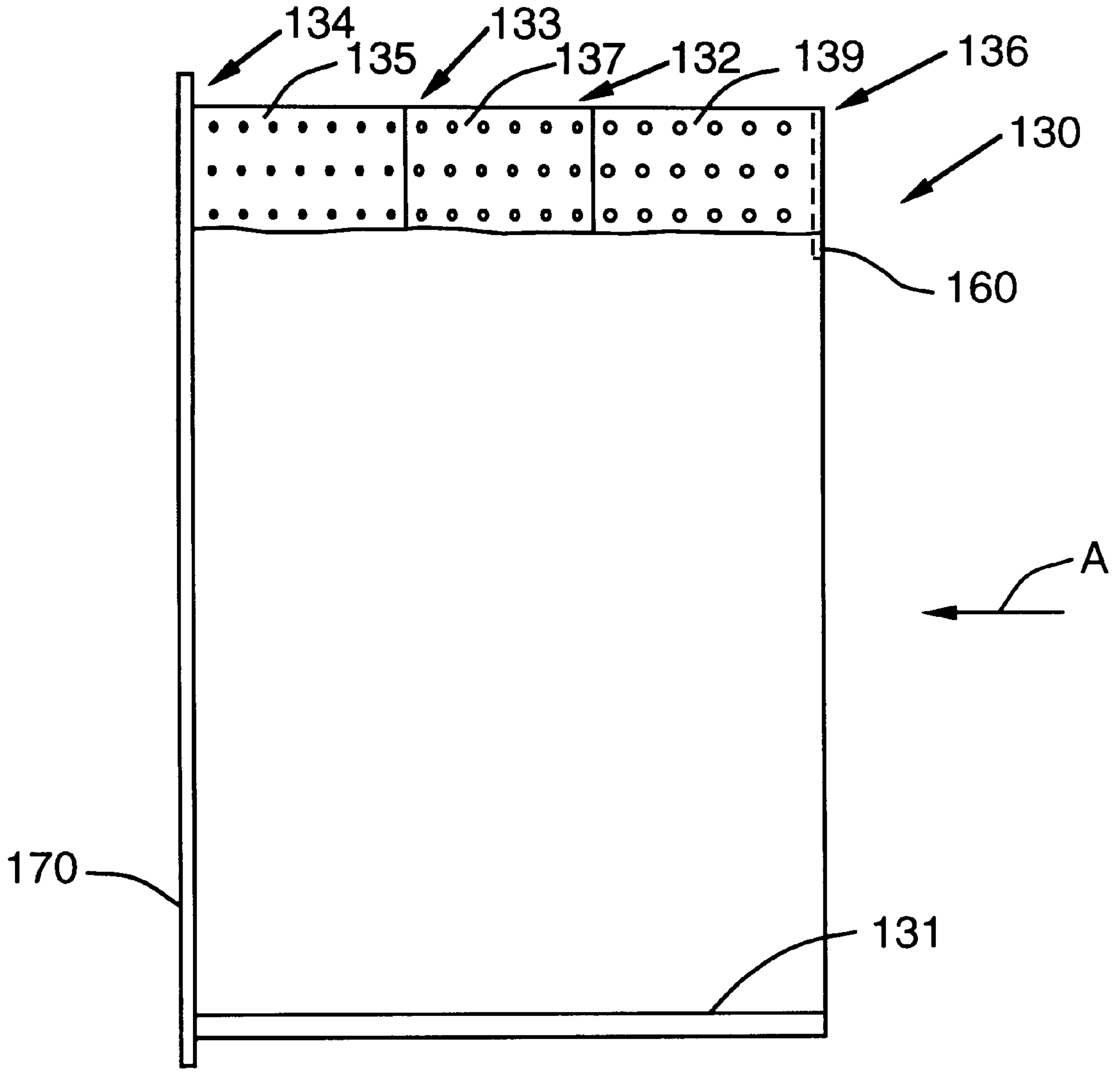
FIG. 10 is an enlarged side view of the airflow inlet device of FIGS. 8 and 9 with some of the skin thereof removed for clarity.

Another preferred embodiment is depicted in FIGS. 8–10. Although this air inlet device 130 is depicted in connection with a fan assembly 10 of the type and construction described above, it will be appreciated that the inlet device 130 can be successfully employed with other air moving apparatuses, including centrifugal fans. As can be seen in FIGS. 8 and 9, the device 130 preferably has a cylindrically-shaped body portion 132 that has a first end 134 and a second end 136 which are substantially equal in diameter. Body portion 132 contains a plurality of apertures therethrough that are arranged in circumferentially-extending rows in the manner described above. That is, the smallest diameter apertures are adjacent to the first end 134 and the apertures gradually increase in diameter by row such that the largest diameter apertures are adjacent the second end 134. See FIG. 10.

For example, for a fan inlet having an approximate diameter of forty-two inches, a preferred fan inlet device 130 would have the characteristics described below. The diameter of the first and second ends (134, 136) of the body member 132 would preferably be approximately fifty-five inches. As can be seen in FIG. 10, the body member 132 includes a cylindrical-shaped frame member 131 that is fabricated from structural steel members. The outer skin, generally designated as 133, is preferably fabricated from segments of perforated sheet metal that have been formed to conform to the frame 131. Preferably, the skin 133 has three segments (135, 137, 139) that are preferably of equal width. Segment 135 is provided with a plurality of equally distributed perforations therein that preferably comprise approximately fifty-one percent of the surface area of the skin segment 135. Likewise, segment 137 is provided with a plurality of equally distributed perforations that preferably comprise about fifty-eight percent of the surface area of the skin segment 137. Segment 139 also has a plurality of equally distributed perforations therethrough that comprise approximately sixty-three percent of the surface area of the skin segment 139. Segments (135, 137, 139) are preferably welded together at their adjoining edges and are also preferably welded to the frame 131.

An end plate 160 is also attached to the second end 134 of the body member 132. The preferred arrangement and densities of the apertures in the device are identical to those densities and arrangements described above. However, the skilled artisan will appreciate that exact aperture size and distribution will be dictated by the application. In addition, the device 130 is preferably provided with a flange 170 for attachment to the flange 17 of the fan assembly inlet 16 in a manner described above.

Figure 11:
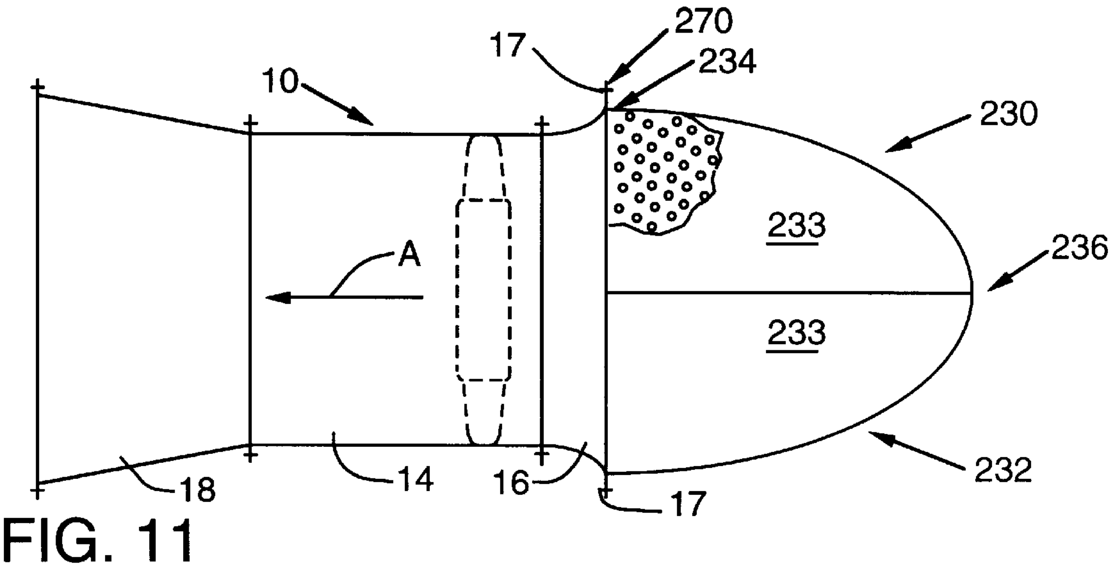
FIG. 11 is a side elevational view of another preferred airflow inlet device of the present invention attached to a fan assembly.
Figure 12:
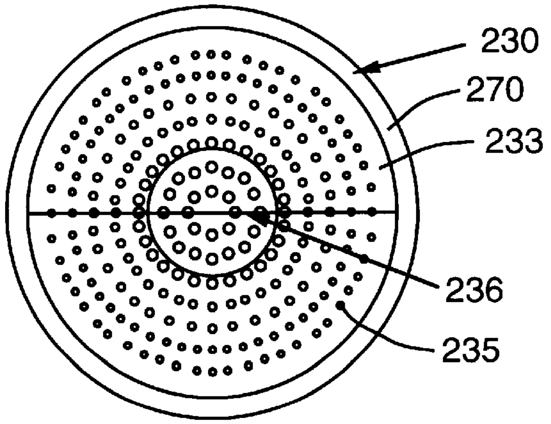
FIG. 12 is an end elevational view of the airflow inlet device of FIG. 10.
Figure 13:
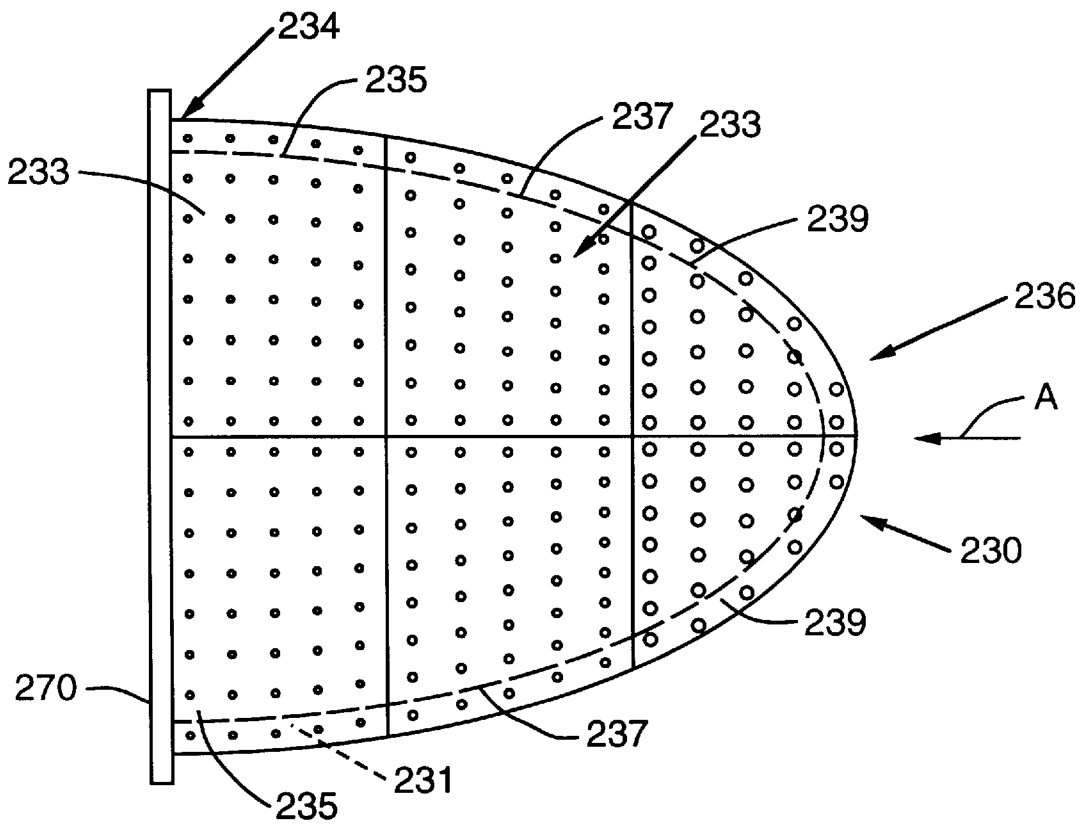
FIG. 13 is an enlarged side view of the airflow inlet device of FIGS. 11 and 12.

Another preferred embodiment of the present invention is shown in FIGS. 11–13. In this embodiment, the inlet device 230 has a body member 232 that has an,elliptical shape as shown in FIG. 10. Body member 232 has a first end 234 and a second end 236. A flange member 270 is attached to the first end 234 to facilitate attachment of the device 230 to the inlet 16 of fan assembly 10 in the manner described above. For example, for a fan inlet having an approximate diameter of forty-two inches, a preferred fan inlet device 230 would have the characteristics described below. The diameter of the first end 234 of the body member 32 would preferably be approximately 55 inches. As can be seen in FIG. 13, the body member 232 includes an elliptical-shaped frame member 231 that is fabricated from structural steel members. The outer skin, generally designated as 233, is preferably fabricated from segments of perforated sheet metal that have been formed to conform to the frame 231. Preferably, the skin 233 has three segments (235, 237, 239) that are preferably equal in width. Segment 235 is provided with a plurality of equally distributed perforations therein that preferably comprise approximately fifty-one percent of the surface area of the skin segment 235. Likewise, segment 237 is provided with a plurality of equally distributed perforations that preferably comprise about fifty-eight percent of the surface area of the skin segment 237. Segment 239 also has a plurality of equally distributed perforations therethrough that comprise approximately sixty-three percent of the surface area of the skin segment 239. Segments (235, 237, 239) are preferably welded together at their adjoining edges and are also preferably welded to the frame 131.

Figure 14:
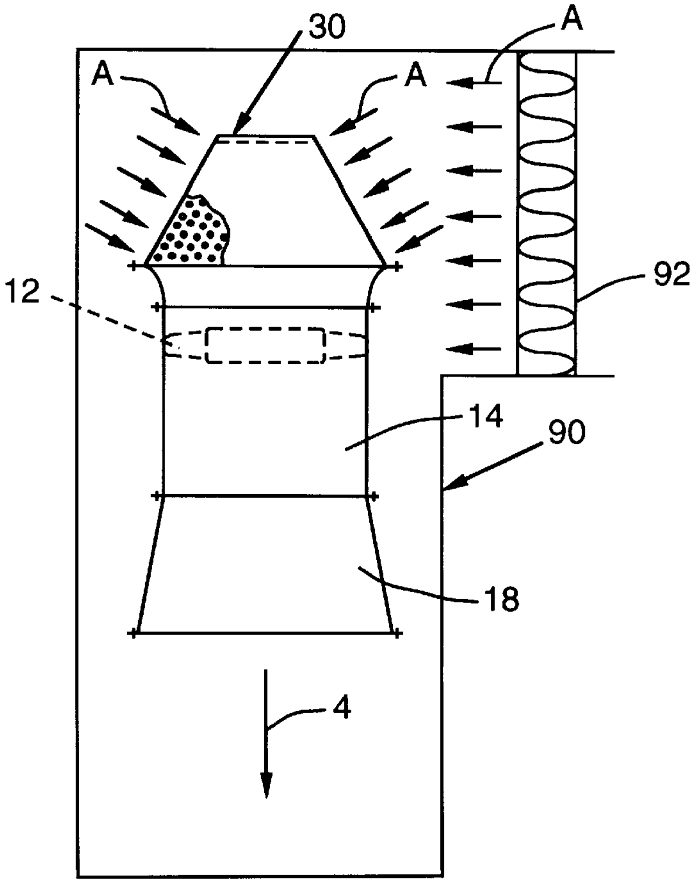
FIG. 14 depicts the airflow inlet device of FIGS. 1–3 attached to a fan assembly that is housed within a duct system wherein inlet airflow is at right angles to the airflow inlet device.
Figure 14A:
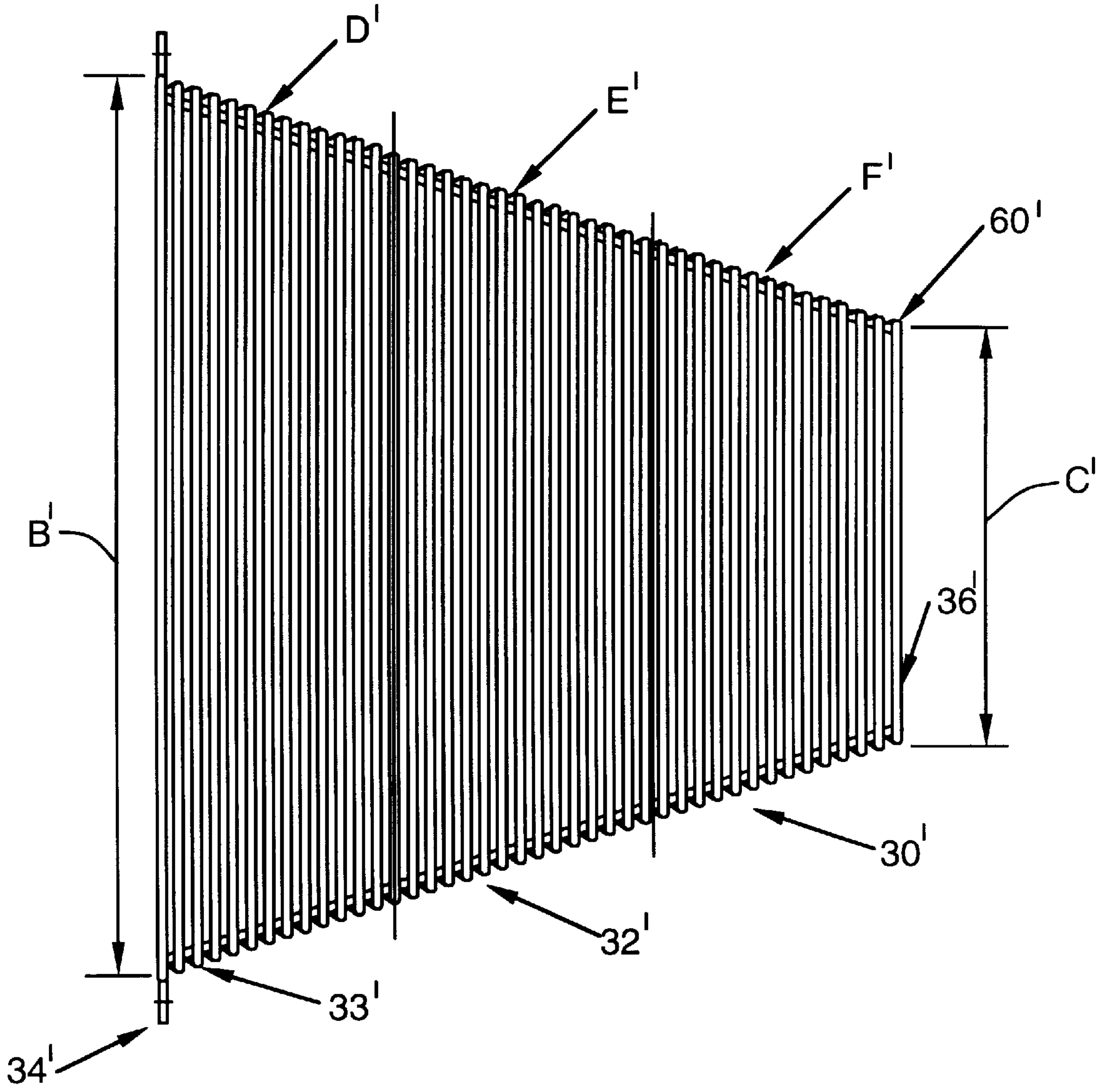
FIG. 14A is a side elevational view of another preferred airflow inlet device of the present invention.

Another preferred fan inlet device 30' is depicted in FIG. 14A. As can be seen in that FIG., preferred airflow inlet device 30' comprises a body member 32', that is fabricated from wire wound around a conically-shaped frame 33'. In a preferred embodiment, 0.25 inch diameter steel wire is used; however, other types and sizes of wire could be successfully employed. The frame member 33' preferably has a first flanged end 34' and a second end 36' wherein the first end 34' is larger in diameter than the second end 36'. By way of example, the first end 34' may have a diameter of 42.75 inches (represented by arrow "B'") and the diameter of the second end may be 20 inches (represented by arrow "C'").

As can be further seen in FIG. 14A, the body member 32' may be segmented into three segments (represented by "D'", "E'", "F'"). In a preferred embodiment, all three segments ("D'", "E'", "F'") are equal in length and for the present example are 11.75 inches long. Preferably, in segment "D'", there is 0.159 inches between each wire wrap. Thus, in segment "D'" there is approximately thirty-nine percent open space. In segment "E'", there is preferably 0.240 inches between each wire wrap and approximately forty-eight percent of segment "E'" is open. In segment "F'", there is approximately 0.318 inches between each wire wrap and approximately fifty-six percent of segment "F'" is open.

Also in the preferred embodiment, an endcap 60' is attached to the second end 36' of the frame 33'. Endcap is fabricated from steel or aluminum and preferably has no perforations therethrough. It will also be appreciated that the flanged end 34' is adapted to be attached to fan assembly in the manners described above. Those of ordinary skill in the art will further appreciate that the body member 32' could be configured in a variety of different conical sizes that are compatible with the sizes and types of air moving devices being employed. Thus, the scope of this embodiment should not be limited to inlet devices having the same diameters, lengths and wire spacing.

The skilled artisan will understand that the above-described fan inlet devices solve many of the problems encountered when using prior inlet leveling screens. The unique designs of the present invention convert inlet airflow from an axial direction to a radial direction which significantly reduces air velocity and eliminates air swirl and turbulence in front of the fan inlet. This results in a substantially even airflow distribution through a coil 92 or any other system component such as a filter or sound attenuator mounted within a system of ductwork 90. See FIG. 14. In addition, due to their compact nature, the inlet devices of the present invention enable the fan assembly 10 to be located at right angles to the inlet area of a duct system as shown in FIG. 14. Thus, the devices of the present invention enable axial fans to be used in applications wherein, due to airflow distortion, they could not previously be used. Another benefit of the fan inlet devices such as (30, 130, 230 and 30') is that they improve the efficiency of any noise attenuators, coils and/or filters placed in proximity therewith because they provide more uniform airflow through such devices.

Figure 15:
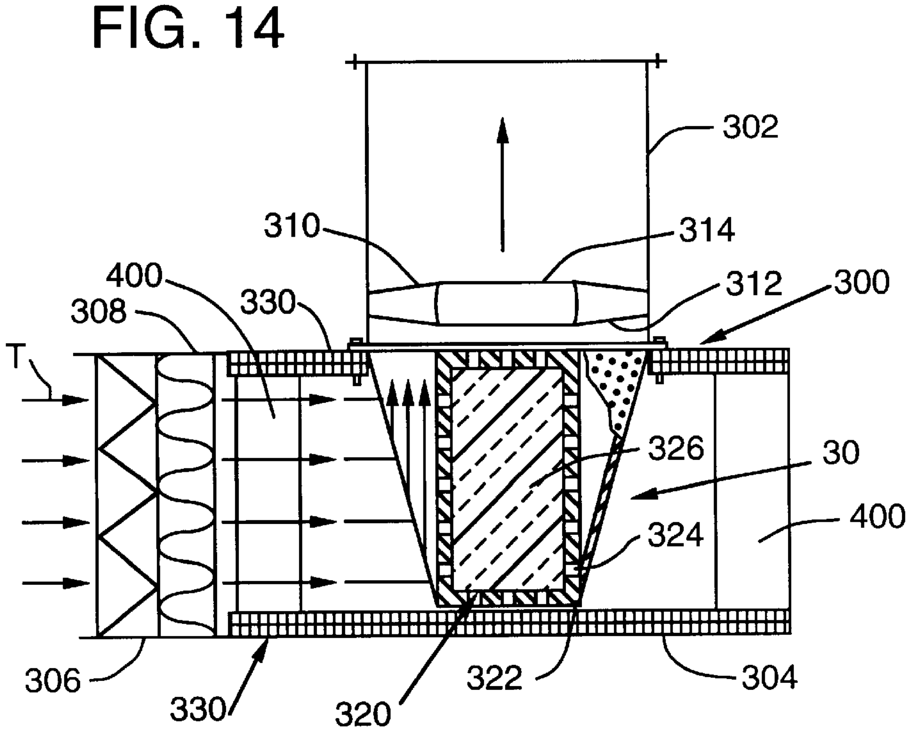
FIG. 15 is a cross-sectional side view of an airflow system employing a preferred inlet device of the present invention.

Another preferred airflow system 300 is shown in FIG. 15. As can be seen in that FIG., a fan 310 is mounted in a section of ductwork 302 that is preferably square or rectangular in cross-section. Fan 310 has an inlet side 312 and an outlet side 314. Attached at right angles to duct 302 is a cross-duct 304. A filter 306 and a heat exchanger coil 308 are, for the purposes of this example, mounted in the cross-duct 304. Arrows "T" represent the airflow through the filter 306, coil 308 and through a preferred air inlet device 30 of the type and construction that was described hereinabove. However, in this embodiment, a silencing assembly 320 is provided within the interior of the inlet device 30.

As can be seen in FIG. 15, a preferred silencing 320 assembly comprises a housing member 322 that is fabricated from perforated steel or aluminum; however, other perforated material could also be used. In a preferred embodiment, perforations 324 are 3⁄32 inches in diameter and comprise twenty-three percent of the surface area of the housing member 322. Housed within the housing member 322 is fiberglass fill material 326 having a preferred density of 2 pounds per cubic foot. However, other acoustical absorbent materials could also be used. The silencing assembly 320 is cylindrical and is disposed within the member 30. The diameter of assembly 320 is preferably similar to that of the hub of fan 312. To further reduce airflow noise, other silencing assemblies 400 are preferably positioned as shown in FIG. 15 within the cross-duct 304.

Figure 16:
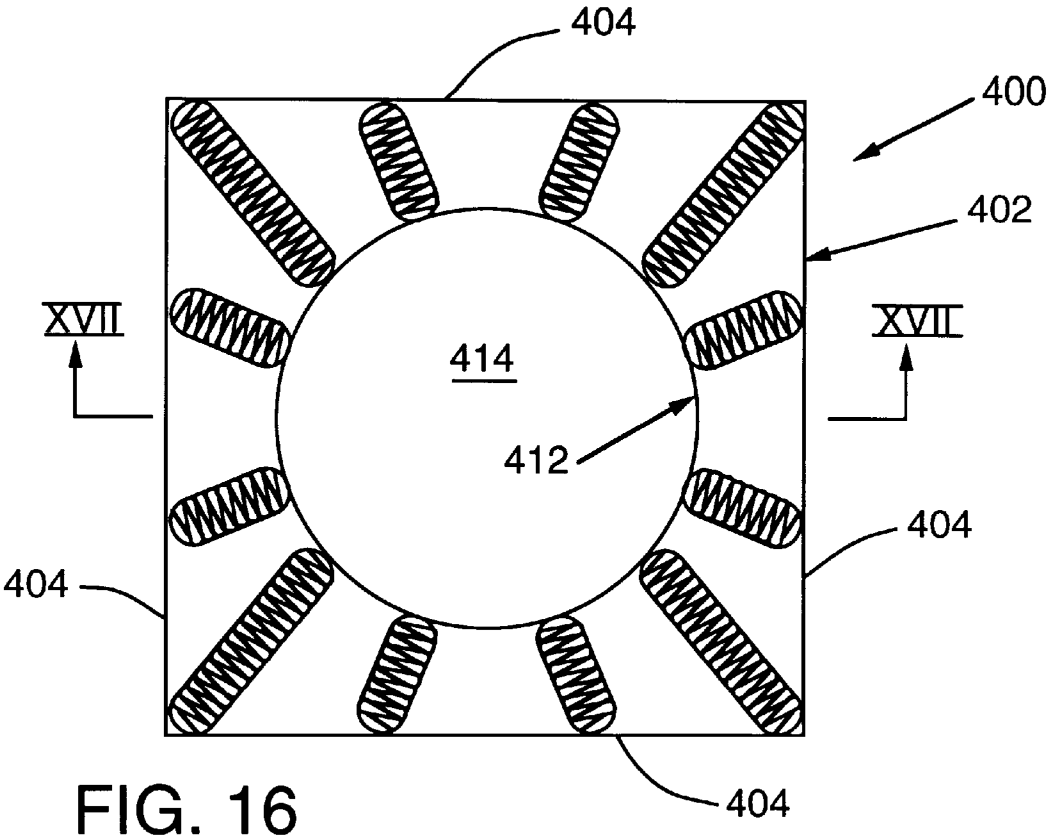
FIG. 16 is a plan view of a preferred silencing assembly of the present invention.
Figure 17:
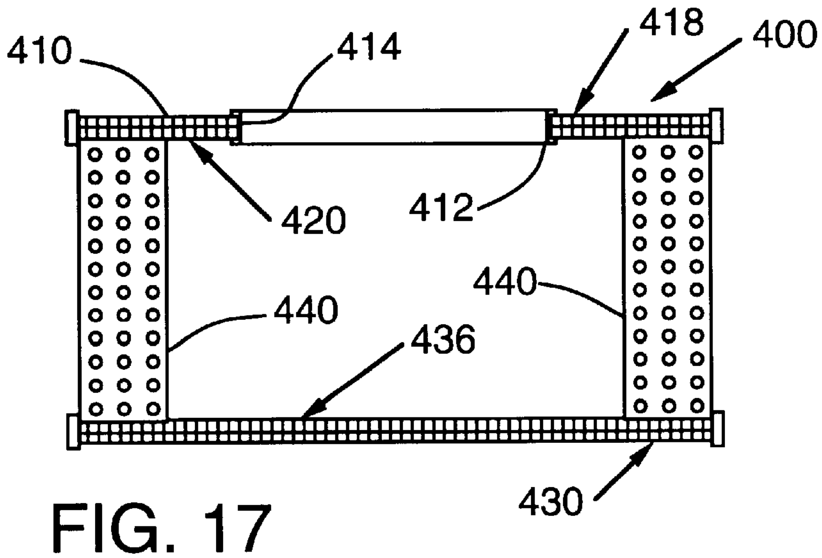
FIG. 17 is a cross-sectional side elevational view of the silencing assembly of FIG. 16 taken along line XVII—XVII in FIG. 16.

A preferred silencing assembly 400 is shown in FIGS. 16 and 17. As can be seen in those FIGS., assembly 400 preferably comprises a housing member 402 that is sized to fit within the cross duct 302. The housing member has a top section 410 and a bottom section 430 and perforated side walls 404. The top section 410 has a centrally disposed ring member 412 that defines a circular-shaped open area 414. As can be seen in FIG. 17, the top section has an outer skin 418 that is preferably fabricated from 18 gauge metal. In addition, an inner skin 420 is arranged in spaced-apart relationship with respect to the outer skin 418. Inner skin 420 is preferably fabricated from 22 gauge perforated sheet metal. The perforations are approximately 3⁄32 inches in diameter and collectively comprise approximately about twenty-three percent of the surface area of the inner skin 420; however, other sizes and densities of perforations could also be used. Housed between the inner skin 420 and the outer skin 418 is fiberglass insulation preferably having a density of two pounds per cubic foot; however, other acoustically absorbent materials could be successfully used.

The bottom portion 430 is preferably similarly constructed with an outer skin 432 fabricated from 18 gauge material and an inner skin 434 fabricated from 22 gauge perforated material. 2.25 inch thick insulation is preferably used between the inner skin 434 and outer skin 432. In addition, a centrally-disposed portion 436 is removably attached to the bottom section 430 for removal therefrom to enable the assembly 400 to be used in applications wherein air is flowing in at least two axial directions.

Figure 18:
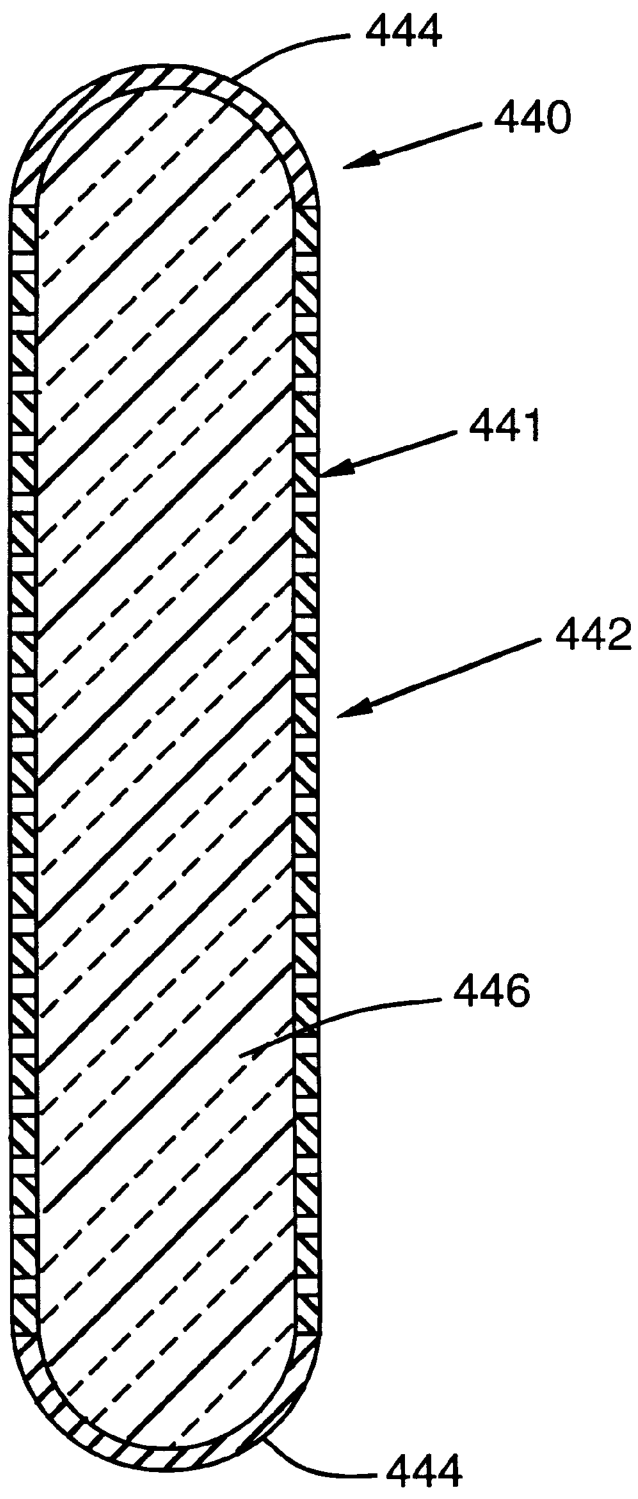
FIG. 18 is a cross-sectional view of a preferred acoustical panel of the present invention.

Also in a preferred embodiment, a plurality of radially extending panels 440 are preferably attached to the top section 410 and the bottom section 430 as shown in FIGS. 16–18. As can be seen in FIG. 18, the walls 442 of panels 440 are fabricated from a perforated material and the ends 444 are fabricated from a non-perforated material of equal thickness. Each panel 440 is preferably filled with an acoustically absorbent material 446 (preferably 2 PCF fiberglass insulation). In a preferred embodiment, the ring member 412 is formed from a channel and is adapted to receive the ends of the panels 440 therein. See FIG. 19. The other ends of the panels 440 are attached to the outer walls by similarly arranged channel members (not shown); however, other types of fastening arrangement may be successfully employed.

Figure 20:
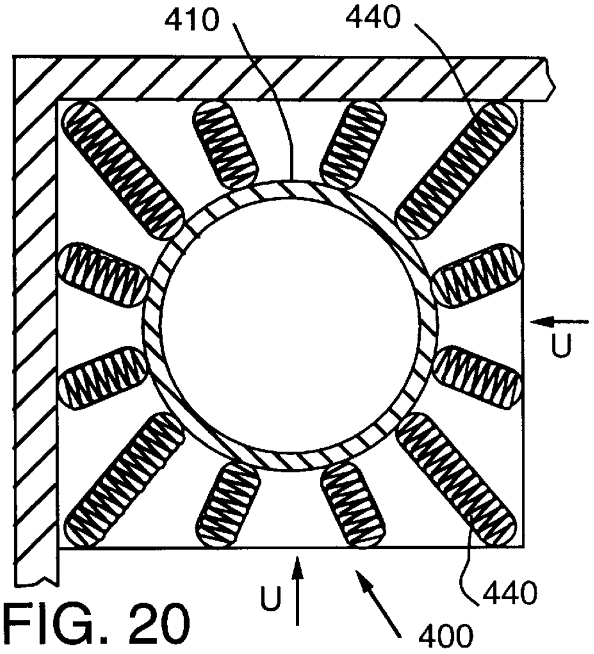
FIG. 20 is a plan view of the silencing assembly of FIG. 16 adapted to receive airflow from two different directions.
Figure 21:
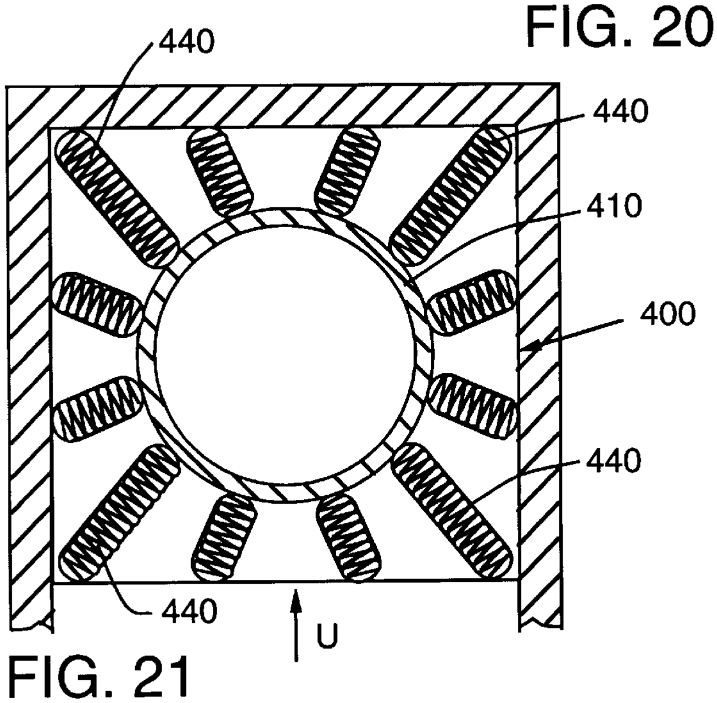
FIG. 21 is a plan view of the silencing, assembly of FIG. 16 adapted to receive airflow from one direction.

In this embodiment, inlet air is adapted to pass through opening 412 and into the fan. As air passes into through opening 412, the noise generated thereby is substantially absorbed by the radially extending panels 440 and optionally the attenuated cylinder 320 mounted within. FIGS. 20–22 illustrate other airflow arrangements with which the device 400 can be used. In particular, FIG. 20 illustrates the use of device 400 in an application where air can enter from three directions. FIG. 21, illustrates the use of device 400 in an application where air can enter from two directions. FIG. 22 illustrates the use of device 400 in an application where air can enter from one direction. In all cases, the unique radial arrangement of the panels 440 serves to reduce airflow noise without occupying the amount of space that is typically required by prior sound attenuation devices.

Accordingly, the present invention provides solutions to the aforementioned problems associated with prior air inlet screens and silencing devices. In particular, the unique designs of the present devices are more compact and efficient than prior air inlet screens. Furthermore, although the present invention is equally effective when used in connection with centrifugal fans, the present invention enable axial fans to be used in applications, where due to large amounts of airflow distortion, could not be previously used. In addition, the present invention provides for effective sound attenuation in compact applications wherein conventional sound attenuation devices could not be used. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. An airflow inlet apparatus for reducing distortion of air entering an inlet end of a fan assembly, said inlet apparatus comprising:

a frame member having a first end attachable to said inlet end of said fan assembly and a second end;

an end member attached to said second end of said body member; and a wire member circumferentially wrapped around said frame member and extending from said first end of said frame member to said second end of said frame member and being attached thereto such that a space is provided between each successive wrap with said spaces between said wraps adjacent said first end of said frame member being smaller than said spaces between said wraps adjacent said second end of said frame member.

2. The apparatus of claim 1 wherein said body member further comprises:

a primary body segment adjacent said first end of said frame member and comprising a plurality of primary wraps of said wire circumferentially extending around said frame member such that a primary space is provided between each primary wrap of said wire;

a secondary body segment comprising a plurality of secondary wraps of said wire circumferentially extending around said frame member in abutting relationship with said primary warps of said wire comprising said primary body segment wherein a secondary space is provided between each secondary wrap of said wire; and a tertiary body segment comprising a plurality of tertiary wraps of said wire circumferentially extending around said frame member in abutting relationship with said secondary wraps of said wire comprising said secondary body segment wherein a tertiary space is provided between each said tertiary wrap of said wire.

3. The apparatus of claim 2 wherein said primary spaces substantially comprising about fifty-one percent of said primary body portion and wherein said secondary spaces substantially comprising about fifty-eight percent of said secondary body segment and wherein said tertiary spaces substantially comprising about sixty-three percent of said tertiary body segment.

4. The apparatus of claim 1 wherein said spaces comprise about sixty percent of said body member.

5. The apparatus of claim 1 wherein said body member is frusto-conically shaped.

* * * * *

UNITED STATES PATENT AND TRADEMARK OFFICE

CERTIFICATE OF CORRECTION

PATENT NO. : 6,193,011 B1
DATED : February 27, 2001
INVENTOR(S) : Harris, Stanley M.

It is certified that error appears in the above-identified patent and that said Letters Patent is hereby corrected as shown below:

Column 3,
Line 37, delete “distorltion” and substitute therefor -- distortion --

Column 4,
Line 31, delete “of an enlarged side view”

Column 5,
Line 18, delete “silencing, assembly” and substitute therefor -- silencing assembly --

Figure 19:
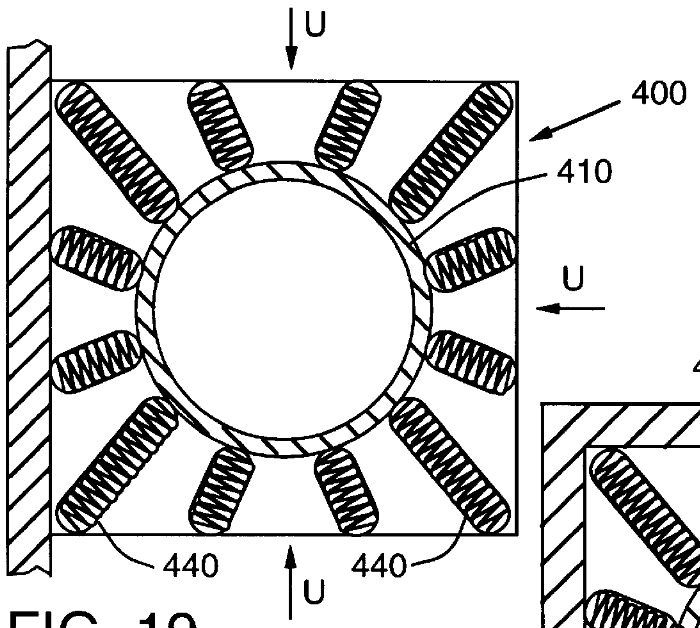
FIG. 19 is a plan view of the silencing assembly of FIG. 16 adapted to receive airflow from three different directions.

Column 10,
Line 5, delete “FIGS. 20-22” and substitute therefor -- FIGS. 19-21 --;
Line 7, delete “FIG. 20” and substitute therefor -- FIG 19 --;
Line 9, delete “FIG. 21” and substitute therefor -- FIG. 20 --;
Line 10, delete “FIG. 22” and substitute therefor -- FIG. 21 --;
Line 23, delete “enable” and substitute therefor -- enables --; and
Line 62, delete “warps” and substitute therefor -- wraps --

Signed and Sealed this

Twenty-second Day of October, 2002

*Attest:*

JAMES E. ROGAN

*Attesting Officer*

*Director of the United States Patent and Trademark Office*